United States Patent
Inoue et al.

(10) Patent No.: US 8,307,561 B2
(45) Date of Patent: Nov. 13, 2012

(54) JIG AND METHOD FOR MEASURING RUNOUT OF FLANGE SURFACE OF HUB UNIT

(75) Inventors: Shigeru Inoue, Yokohama (JP); Keiichiro Isoda, Osaka (JP); Tsutomu Senoo, Kakogawa (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 36 days.

(21) Appl. No.: 12/737,531

(22) PCT Filed: Jul. 22, 2009

(86) PCT No.: PCT/JP2009/063078
§ 371 (c)(1),
(2), (4) Date: Jan. 21, 2011

(87) PCT Pub. No.: WO2010/010882
PCT Pub. Date: Jan. 28, 2010

(65) Prior Publication Data
US 2011/0113637 A1    May 19, 2011

(30) Foreign Application Priority Data
Jul. 22, 2008  (JP) .............................. P2008-188407

(51) Int. Cl.
*G01M 17/013* (2006.01)
*G01B 5/255* (2006.01)
(52) U.S. Cl. ............................... 33/203; 33/550; 33/573
(58) Field of Classification Search .................... 33/193, 33/203, 203.15, 203.16, 203.17, 288, 533, 33/550, 573, 600, 608, 609, 610
See application file for complete search history.

(56) References Cited

U.S. PATENT DOCUMENTS

| | | | | |
|---|---|---|---|---|
| 3,854,216 A | * | 12/1974 | Mosher | 33/609 |
| 4,386,469 A | * | 6/1983 | Lapsker | 33/203.19 |
| 5,103,414 A | * | 4/1992 | Papadopoulos | 700/279 |
| 5,224,272 A | * | 7/1993 | Toraason et al. | 33/504 |
| 6,250,814 B1 | | 6/2001 | Tajima et al. | |
| 6,357,925 B2 | | 3/2002 | Tajima et al. | |
| 6,575,637 B1 | * | 6/2003 | Tajima et al. | 384/544 |
| 6,735,878 B2 | * | 5/2004 | Lie | 33/203 |
| 7,832,939 B2 | | 11/2010 | Umekida et al. | |
| 2005/0018939 A1 | | 1/2005 | Niwa et al. | |
| 2006/0261667 A1 | * | 11/2006 | Sensui et al. | 301/105.1 |

FOREIGN PATENT DOCUMENTS

| | | | |
|---|---|---|---|
| JP | 61-132703 U | | 8/1986 |
| JP | 2000-203208 A | | 7/2000 |
| JP | 2003-154801 A | | 5/2003 |
| JP | 2005-59832 A | | 3/2005 |
| JP | 2005195061 A | * | 7/2005 |
| SU | 1783277 A1 | * | 12/1992 |

* cited by examiner

*Primary Examiner* — R. A. Smith
(74) *Attorney, Agent, or Firm* — McGinn IP Law Group, PLLC

(57) ABSTRACT

There is provided a jig for measuring a runout of a flange surface of a hub unit adapted to be fitted between a plurality of plate-shaped projecting portions of a road wheel mounting flange of a deformed type including the plurality of plate-shaped projecting portions. The projecting portions are formed on an outer circumferential surface of a hub wheel serving as a rotating side member of a road wheel hub unit so as to project radially. Each of the projecting portions has a bolt insertion hole in a distal end portion thereof. The jig is positioned adjacent to a flange surface of the projecting portions so as to form an annular continuous surface.

2 Claims, 4 Drawing Sheets

JIG AND METHOD FOR MEASURING RUNOUT OF FLANGE SURFACE OF HUB UNIT

TECHNICAL FIELD

The present invention relates to a jig and a method for measuring a runout of a flange surface of a vehicle hub unit on which a disc rotor of a disc brake unit and a road wheel are mounted.

1. Background Art

Conventionally, a road wheel hub unit is rotatably mounted to a vehicle body via a bearing by fastening a flange of a hub wheel to a disc rotor and a road wheel with bolts.

The flange of the hub wheel is formed into a substantially circular shape (see Patent Document 1, for example).

Although substantially circular flanges like this have constituted the main stream of flanges of hub wheels, in recent years, for the sake of reduction in weight, flanges of a deformed type have started to be adopted.

The flange of the deformed type is referred to as a flange of a type in which bolt insertion holes are formed in distal ends of flanges which extend radially from a hub wheel to project (see Patent Document 2, for example).

There is a plate measuring method for measuring a runout of the flange surface of the deformed type of the hub wheel of the vehicle hub unit by placing a circular plate on the surfaces of the flanges and rotating the flanges so as to measure a runout of the flange surface of the deformed type from a runout of the circular plate.

2. Related Art Documents

Patent Documents

Patent Document 1: JP-A-2000-203208 (Page 1, FIG. 1)
Patent Document 2: JP-A-2005-59832 (Page 1, FIG. 2)

SUMMARY OF THE INVENTION

Problem to be Solved by the Invention

The road wheel mounting flange that the rotating side member of the hub wheel of the conventional hub unit possesses is formed into the substantially circular shape. When measuring a runout of such road wheel mounting flanges in a mass production process, a runout of flanges is measured by a dial gauge method in which a flange surface is directly measured for a runout by use of a dial gauge.

However, when measuring a runout of each of the constituent flanges of the road wheel mounting flange of the deformed type by the dial gauge method, since the flanges are separated from each other, the measuring of a runout of the constituent flanges is performed intermittently, whereby a measuring terminal of the dial gauge comes off or a measuring value of runout is increased in an abnormal fashion in the middle of measurement. Because of this, to enable the measurement, the measuring speed needs to be reduced or a new facility needs to be introduced. When attempting to make this happen, there has been caused a problem that the cycle time is increased or the costs for investment in introduction of the new facility are increased.

The invention has been made in view of solving the problems and an object thereof is to provide a jig for measuring a runout of a flange of a hub unit which can eliminate the fall of a measuring terminal of a dial gauge when measuring a runout of a road wheel mounting flange of a deformed type or a vehicle body mounting flange of a deformed type of a hub unit by use of the dial gauge and an abnormal increase in measurement value of runout and a method for measuring a runout of the flange of the hub unit by use of the measuring jig.

Means for Solving the Problem

According to the invention, there is provided a jig for measuring a runout of a flange surface of a hub unit adapted to be fitted between a plurality of plate-shaped projecting portions of a road wheel mounting flange of a deformed type including the plurality of plate-shaped projecting portions which are formed on an outer circumferential surface of a rotating side member of a road wheel hub unit so as to project radially therefrom and each of which has a bolt insertion hole in a distal end portion thereof so as to be positioned adjacent to a flange surface of the projecting portions to form an annular continuous surface.

Advantages of the Invention

In a runout measuring method of the invention, the hub unit flange measuring jig is combined with the road wheel mounting flange of the deformed type of the hub unit to be fitted between the projecting portions of the road wheel mounting flange of the deformed type so as to be positioned adjacent to the flange surface of the projecting portions to form the annular continuous surface. Then, a leading end of the measuring terminal of the dial gauge is brought into abutment with the annular continuous surface. With the dial gauge fixed, the road wheel mounting flange of the deformed type is rotated, or with the road wheel mounting flange of the deformed type fixed, the dial gauge is rotationally moved along the annular continuous surface, so as to measure a runout of the flange surface of each of the projecting portions of the road wheel mounting flange of the deformed type. Therefore, the dial gauge measures the annular continuous surface for a runout. Accordingly, the conventional intermittent runout measuring is eliminated, which can provide an advantage that the fall of the measuring terminal of the dial gauge is prevented or the occurrence of abnormal increase in measurement value of runout in the middle of measurement is prevented, thereby making it possible to have the same cycle time as the conventional one.

MODE FOR CARRYING OUT THE INVENTION

Embodiment 1

Figure 1:
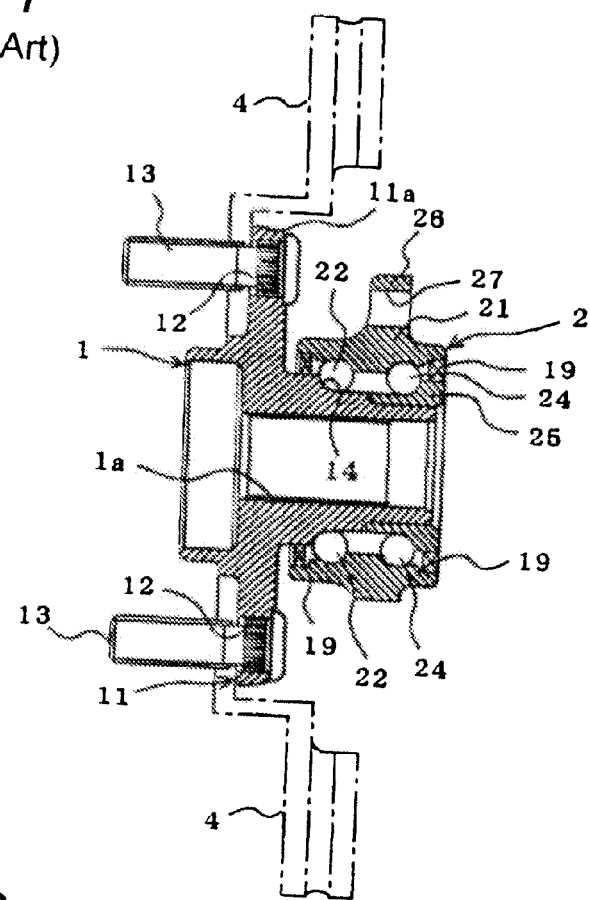
FIG. 1 is a sectional view of a hub unit for which a jig for measuring a runout of a flange of a hub unit according to Embodiment 1 of the invention is used.
Figure 2:
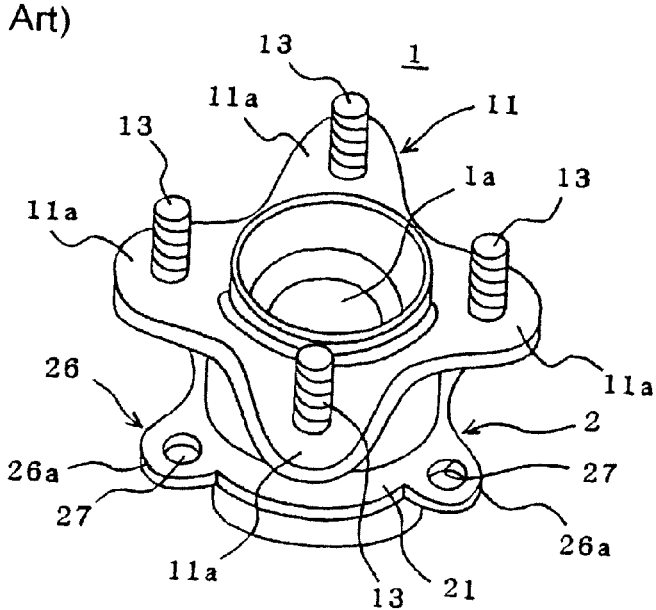
FIG. 2 is a perspective view of the hub unit for which the hub unit flange runout measuring jig is used.
Figure 3:
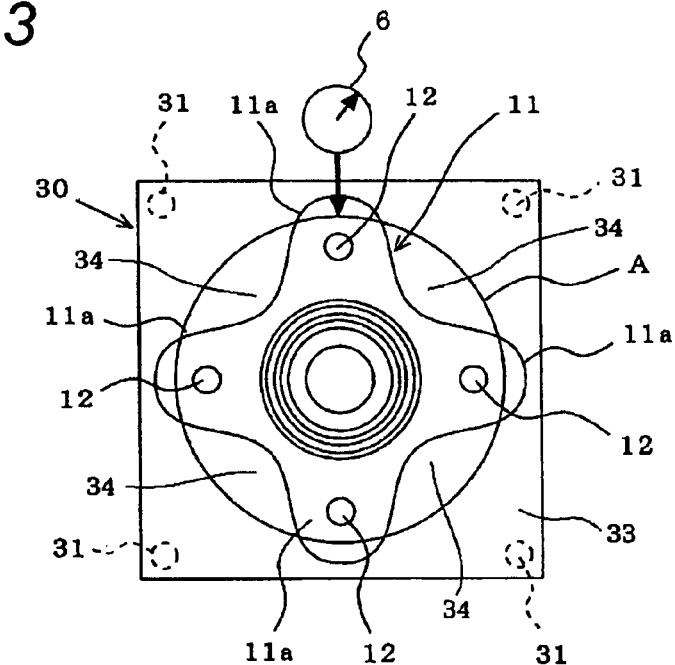
FIG. 3 is a plan view of the hub unit on which the hub unit flange runout measuring jig is mounted.
Figure 4:
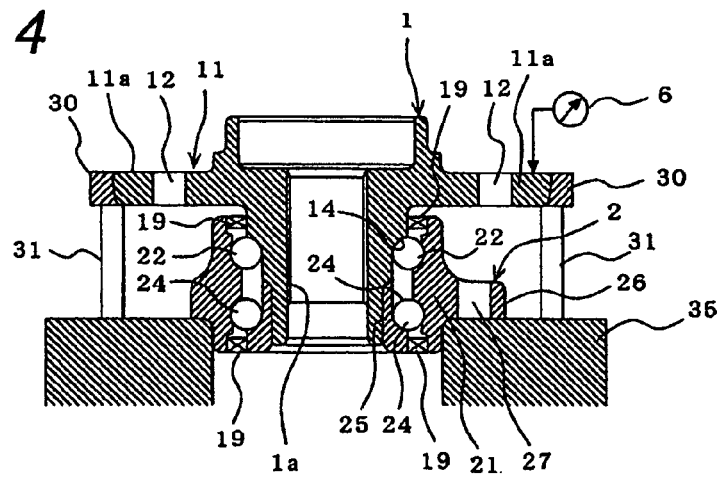
FIG. 4 is a sectional view showing a state in which a runout of a road wheel mounting flange of a deformed type is measured by use of the hub unit flange runout measuring jig.
Figure 5:
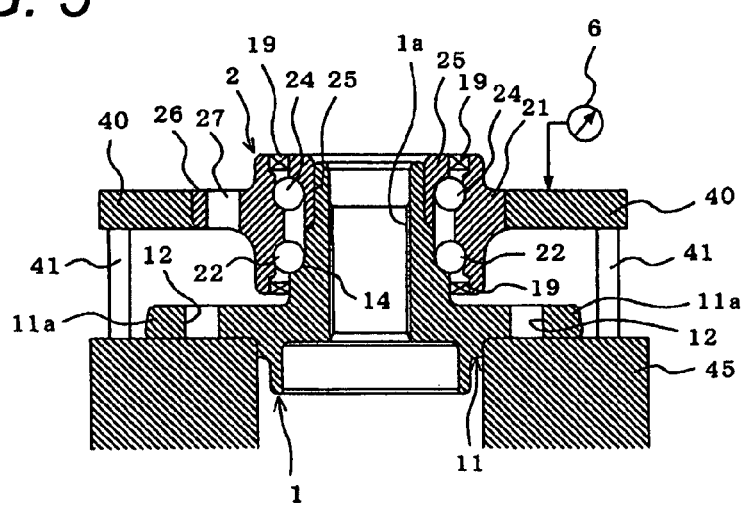
FIG. 5 is a sectional view showing a state in which a runout of a vehicle body mounting flange of a deformed type is measured by use of the hub unit flange runout measuring jig.

FIG. 1 is a sectional view of a hub unit for which a jig for measuring a runout of a flange of a hub unit according to Embodiment 1 of the invention is used, FIG. 2 is a perspective view of the hub unit for which the hub unit flange runout measuring jig is used, FIG. 3 is a plan view of the hub unit on which the hub unit flange runout measuring jig is mounted, FIG. 4 is a sectional view showing a state in which a runout of a road wheel mounting flange of a deformed type is measured by use of the hub unit flange runout measuring jig, and FIG. 5 is a sectional view showing a state in which a runout of a vehicle body mounting flange of a deformed type is measured by use of the hub unit flange runout measuring jig.

A hub unit which is an axle bearing unit shown in FIG. 1 is a hub unit of an inner ring rotating type which is used on a driving wheel of a motor vehicle and includes a hub wheel 1 which is a rotating side member and a double-row rolling bearing 2.

The hub wheel 1 is formed of carbon steel or bearing steel through forging or the like and has a hollow construction. A road wheel mounting flange 11 is formed on an outer circumferential surface of the hub wheel 1 at a vehicle outer side thereof in an axial direction so as to extend radially outwards.

This road wheel mounting flange 11 is a flange of a deformed type, in which four plate-shaped projecting portions 11a are formed so as to project radially from the hub wheel 1, and a bolt insertion hole 12 is provided in a distal end of each of the projecting portions 11a.

A spline is formed on a predetermined area of a hollow bore 1a of the hub wheel 1, and a raceway 14 for a vehicle outer side row of balls 22 of the double-row rolling bearing 2 is formed on the outer circumferential surface of the hub wheel 1 in a position lying further vehicle inner side than the flange 11. A shaft member (not shown) is spline fitted in the hollow bore 1a.

The double-row rolling hearing 2 includes a single outer ring 21 formed of carbon steel or bearing steel and having two rows of raceway grooves, pluralities of balls 22, 24 formed of a bearing steel and functioning as rolling elements which are arranged in two rows and an inner ring 25 formed of carbon steel or bearing steel and having a raceway groove for the row of balls 24 lying vehicle inner side. An inner ring having a raceway groove for the row of balls 22 lying vehicle outer side is formed integrally on the hub wheel.

A disc rotor 4 and a road wheel (whose illustration is omitted) are mounted to the projecting portions 11a of the road wheel with bolts 13 which are securely inserted through the bolt insertion holes 12.

In addition, a vehicle body mounting flange 26 is provided on the outer ring 21 of the double-row rolling bearing 2 so as to extend radially outwards therefrom, and this vehicle body mounting flange 26 has four projecting portions 26a which are formed so as to project radially from the outer ring 21 and bolt holes 27 which are formed individually in distal ends of the projecting portions 26a. The vehicle body mounting flange 26 is mounted to a vehicle body (whose illustration is omitted) with bolts (whose illustrations are omitted) which are securely inserted through the bolts holes 27.

Reference numeral 19 denotes seal members 19 which are mounted to ends of a bearing space of the double-row rolling bearing 2.

Next, a jig for measuring a runout of a flange of a hub unit will be described by reference to FIGS. 3 and 4.

This hub unit flange runout measuring jig 30 is such as to be formed in consideration of an axle bearing unit having a flange of a deformed type as is shown in FIGS. 1 and 2.

The hub unit flange runout measuring jig 30 is formed by cutting a shape matching the shape of the road wheel mounting flange 11 from which the four plate-shaped projecting portions 11a project radially in a plate material whose outside diameter is slightly larger than an outside diameter of the road wheel mounting flange 11 as if the plate material so cut out functions as a female die. Namely, the hub unit flange runout measuring jig 30 includes an annular portion 33 having a diameter which is the same as the outside diameter of the road wheel mounting flange 11 and a plurality of protruding portions 34 which protrude from the annular portion 33 so as to fill spaces defined between the projecting portions 11a.

Consequently, when this hub unit flange runout measuring jig 30 is combined with the flange of the deformed type of the hub unit, as is shown in FIG. 3, the spaces defined between the projecting portions 11a of the road wheel mounting flange 11 are filled with the protruding portions 34 of the hub unit flange runout measuring jig 30 so as to eliminate any gaps between the projecting portions 11a, whereby the protruding portions 34 are allowed to lie adjacent to flange surfaces of the projecting portions 11a so as to form an annular continuous surface.

In addition, although the external shape of the hub unit flange runout measuring jig 30 is, as is shown in FIG. 3, formed into a square shape, other shapes may be adopted which include a circular shape.

Further, four support legs 31 are provided on a lower surface of the hub unit flange runout measuring jig 30 so as to be placed on a hub unit measuring table 35.

A height-wise dimension of the support legs 31 is set so that the flange surfaces of the projecting portions 11a of the road wheel mounting flange 11 of the hub wheel 1 become flush with an upper surface of the hub unit flange runout measuring jig 30 when the outer ring 21 of the double-row rolling bearing 2 of the hub unit is fixedly placed on the measuring table 35 and the hub unit flange runout measuring jig 30 is combined with the rotatably hub wheel 1.

Next, an example will be described in which a runout of the flange surfaces of the projecting portions 11a which constitute the flange surface of the road wheel mounting flange 11 of the hub unit is measured using the hub unit flange runout measuring jig 30.

Firstly, as is shown in FIG. 4, the outer ring 21 of the double-row rolling bearing 2 of the hub unit that has been built up is fixedly placed on the measuring table 35. Then, the hub wheel 1 is allowed to rotate.

Next, the four support legs 31 of the hub unit flange runout measuring jig 30 are placed on the measuring table 35, and the female die of the hub unit flange runout measuring jig 30 is disposed so as to fill the spaces defined between the projecting portions 11a of the road wheel mounting flange 11. Then, the flange surfaces of the projecting portions 11a which constitute the flange surface of the road wheel mounting flange 11 of the hub unit becomes flush with the upper surface of the hub unit flange runout measuring jig 30, whereby the upper surface of the hub unit flange runout measuring jig 30 lie adjacent to the flange surfaces of the projecting portions 11a so as to form an annular continuous surface.

Then, a leading end of a measuring terminal of a dial gauge 6 is brought into abutment with the flange surface of one of the projecting portions 11a of the road wheel mounting flange 11 of the hub wheel 1, and the hub wheel 1 is then rotated through one full rotation so as to measure a runout of the flange surface of each of the projecting portions 11a which constitute the flange surface of the road wheel mounting flange 11 by the dial gauge 6. In FIG. 3, reference character A denotes a locus that is drawn by the leading end of the measuring terminal of the dial gauge 6 in association with the rotation of the hub wheel 1. Note that with the hub wheel 1 fixed, the dial gauge 6 may be rotationally moved relative to the annular continuous surface.

In this way, the hub unit flange runout measuring jig 30 fills the spaces defined between the projecting portions 11*a* of the road wheel mounting flange 11, and the flange surfaces of the projecting portions 11*a* which constitute the flange surface of the road wheel mounting flange 11 become flush with the upper surface of the hub unit flange measuring jig 30, whereby the upper surface of the hub unit flange runout measuring jig 30 lies adjacent to the flange surfaces of the projecting portions 11*a* so as to form the annular continuous surface. Therefore, the conventional intermittent measurement is eliminated, whereby not only the fall of the measuring terminal of the dial gauge 6 but also the occurrence of abnormal increase in measurement value of runout in the middle of measurement is prevented.

Note that the runout of each of the projecting portions 11*a* of the road wheel mounting flange 11 becomes larger as the projecting portions 11*a* extend radially outwards. Therefore, to enable a severe control of runout, the abutment position of the dial gauge 6 is preferably set to an intermediate position between a circumcircle of the bolt insertion hole 12 in the projecting portion 11*a* and an outer edge of the projecting portion 11*a*.

FIG. 5 shows an example of measuring a runout of a flange surface of the vehicle body mounting flange 26 in which the four projecting portions 26*a* formed on the outer ring 21 of the double-row rolling bearing 2 extend radially outwards.

A jig 40 for measuring a runout of a flange of a hub unit used in this case is formed by cutting a shape matching the shape of the vehicle body mounting flange 26 which is formed by providing the four projecting portions 26*a* which project radially in a plate material having a thickness which is substantially the same as that of the vehicle body mounting flange 26 and an outside diameter which is slightly larger than an outside diameter of the vehicle body mounting flange 26 as if the plate material so cut out functions as a female die.

Consequently, when this hub unit flange runout measuring jig 40 is combined with the outer ring 21 of the double-row rolling bearing 2 of the hub unit, spaces defined between the projecting portions 26*a* of the vehicle body mounting flange 26 are filled with the hub unit flange runout measuring jig 40 so as to eliminate any gaps between the projecting portions 26*a*, whereby the hub unit flange runout measuring jig 40 is allowed to lie adjacent to flange surfaces of the projecting portions 26*a* so as to form an annular continuous surface.

Four support legs 41, which are similar to the four support legs 31 of the hub unit flange runout measuring jig 30, are also provided on this hub unit flange runout measuring jig 40.

Next, an example will be described in which a runout of the respective flange surfaces of the projecting portions 26*a* of the vehicle body mounting flange 26 formed on the outer ring 21 of the hub unit is measured by use of the hub unit flange runout measuring jig 40.

Firstly, as is shown in FIG. 5, the road wheel mounting flange 11 of the hub unit that has been built up is fixedly placed on a measuring table 45. Then, the outer ring 21 having the vehicle body mounting flange 26 is allowed to rotate.

Next, the four support legs 41 of the hub unit flange runout measuring jig 40 are placed on the measuring table 45, and the female die of the hub unit flange runout measuring jig 40 is disposed so as to fill the spaces defined between the projecting portions 26*a* of the vehicle body mounting flange 26. Then, the flange surfaces of the projecting portions 26*a* of the vehicle body mounting flange 26 of the outer ring 21 becomes flush with an upper surface of the hub unit flange runout measuring jig 40, whereby the upper surface of the hub unit flange runout measuring jig 40 lie adjacent to the flange surfaces of the projecting portions 26*a* so as to form an annular continuous surface.

Then, the leading end of the measuring terminal of the dial gauge 6 is brought into abutment with the flange surface of one of the projecting portions 26*a* of the vehicle body mounting flange 26 of the outer ring 21, and the outer ring 21 is then rotated through one full rotation so as to measure a runout of the flange surface of each of the projecting portions 26*a* which constitute the flange surface of the vehicle body mounting flange 26 by the dial gauge 6.

Note that with the outer ring 21 fixed, the dial gauge 6 may be rotationally moved relative to the annular continuous surface.

In this case, too, the hub unit flange runout measuring jig 40 fills the spaces defined between the projecting portions 26*a* of the vehicle body mounting flange 26, and the flange surfaces of the projecting portions 26*a* of the vehicle body mounting flange 26 become flush with the upper surface of the hub unit flange measuring jig 40, whereby the upper surface of the hub unit flange runout measuring jig 40 lies adjacent to the flange surfaces of the projecting portions 26*a* so as to form the annular continuous surface. Therefore, the conventional intermittent measurement is eliminated, whereby not only the fall of the measuring terminal of the dial gauge 6 but also the occurrence of abnormal increase in measurement value of runout in the middle of measurement is prevented.

Embodiment 2

Figure 6:
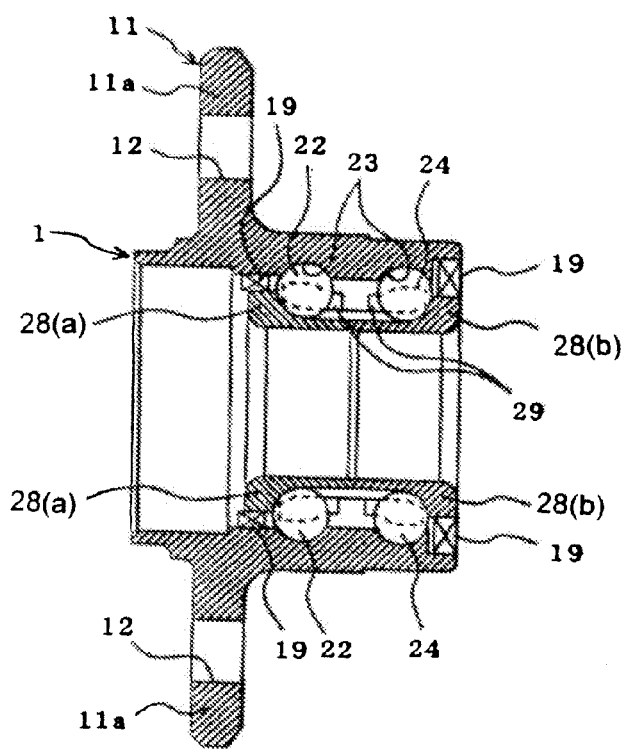
FIG. 6 is a sectional view of a hub unit for which a jig for measuring a runout of a flange of a hub unit according to Embodiment 2 of the invention is used.
Figure 7:
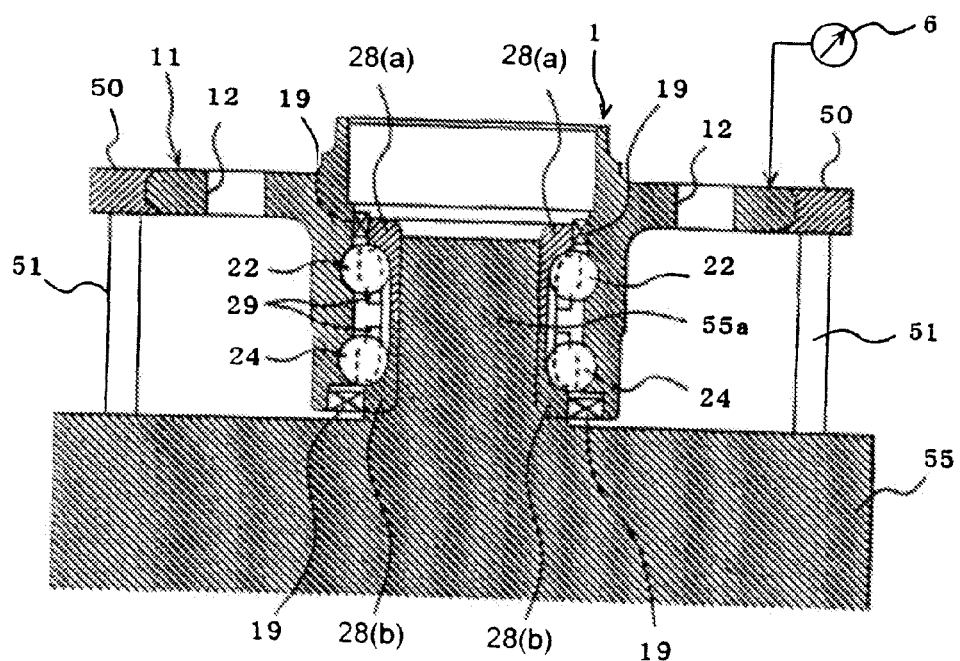
FIG. 7 is a sectional view showing a state in which a runout of a road wheel mounting flange of a deformed type is measured by use of the hub unit flange runout measuring jig.

FIG. 6 is a sectional view of a hub unit for which a jig for measuring a runout of a flange of a hub unit according to Embodiment 2 of the invention is used, and FIG. 7 is a sectional view showing a state in which a runout of a road wheel mounting flange of a deformed type is measured by use of the hub unit flange runout measuring jig.

A hub unit which is an axle bearing unit shown in FIG. 6 is a hub unit of an outer ring rotating type which is used on a driven wheel of a motor vehicle and includes a hub wheel 1 which is a rotating side member and a double-row rolling bearing 2.

The hub wheel 1 is formed of carbon steel or bearing steel through forging or the like and has a hollow construction. A road wheel mounting flange 11 is formed on an outer circumferential surface of the hub wheel 1 at a vehicle outer side thereof in the axial direction so as to extend radially outwards.

This road wheel mounting flange 11 is a flange of a deformed type, in which four plate-shaped projecting portions 11*a* are formed so as to project radially from the hub wheel 1, and a bolt insertion hole 12 is provided in a distal end of each of the projecting portions 11*a*.

Two rows of raceway grooves 23 are formed on an inner circumferential surface of a vehicle inner side portion of the hub wheel 1 for two vehicle outer side and inner side rows of balls 22, 24 of the double-row rolling bearing 2.

Consequently, the double-row rolling bearing 2 includes an outer ring having the two rows of raceway grooves 23 and formed integrally on the hub wheel 1, pluralities of balls 22, 24 as rolling elements which are arranged in two rows, a vehicle outer side inner ring 28*a* having a raceway groove for the vehicle outer side row of balls 22 and a vehicle inner side inner ring 28*b* having a raceway groove for the vehicle inner side row of balls 24. Reference numeral 29 denotes cages for the balls 22, 24.

The disc rotor 4 of the disc brake unit and the road wheel (whose illustration is omitted) are mounted to the constituent flanges 11a of the road wheel mounting flange 11 of the hub wheel 1 with bolts 13 which are securely inserted through the bolt insertion holes 12.

Next, a jig 50 for measuring a runout of a flange of a hub unit will be described by reference to FIGS. 6 and 7.

This hub unit flange runout measuring jig 50 of Embodiment 2 is formed by cutting a shape matching the shape of the road wheel mounting flange 11 in a plate material having an outside diameter larger than an outside diameter of the road wheel mounting flange 11 as if the plate material so cut out functions as a female die.

Consequently, when this hub unit flange runout measuring jig 50 is combined with the hub unit, spaced defined between the projecting portions 11a of the road wheel mounting flange 11 are filled by the hub unit flange runout measuring jig 50 so as to eliminate any gaps between the projecting portions 11a, whereby the hub unit flange runout measuring jig 50 is allowed to lie adjacent to flange surfaces of the projecting portions 11a so as to form an annular continuous surface.

In addition, the outside diameter of the hub unit flange runout measuring jig 50 may only have to be larger than an outside diameter defined by respective distal ends of the flanges 11a of the road wheel mounting flange 11, and the hub unit flange runout measuring jig 50 may be square or circular. Further, four support legs 51 are provided on a lower surface of the hub unit flange runout measuring jig 50 so as to be placed on a hub unit measuring table 55.

Next, an example will be described in which a runout of the flange surfaces of the projecting portions 11a which constitute the flange surface of the road wheel mounting flange 11 of the hub unit is measured using the hub unit flange runout measuring jig 50.

Firstly, as is shown in FIG. 7, the inner rings 28a, 28b of the double-row rolling bearing 2 of the hub unit that has been built up are fixedly fitted on a fixing shaft 55a which projects from the measuring table 55. Then, the hub wheel 1 is allowed to rotate.

Next, the four support legs 51 of the hub unit flange runout measuring jig 50 are placed on the measuring table 55, and the female die of the hub unit flange runout measuring jig 50 is disposed so as to fill the spaces defined between the projecting portions 11a of the road wheel mounting flange 11. Then, the flange surfaces of the projecting portions 11a which constitute the flange surface of the road wheel mounting flange 11 of the hub unit becomes flush with an upper surface of the hub unit flange runout measuring jig 50, whereby the upper surface of the hub unit flange runout measuring jig 50 lie adjacent to the flange surfaces of the projecting portions 11a so as to form an annular continuous surface.

Then, the leading end of the measuring terminal of the dial gauge 6 is brought into abutment with the flange surface of one of the projecting portions 11a of the road wheel mounting flange 11 of the hub wheel 1, and the hub wheel 1 is then rotated through one full rotation so as to measure a runout of the flange surface of each of the projecting portions 11a which constitute the flange surface of the road wheel mounting flange 11 by the dial gauge 6.

Note that with the hub wheel 1 fixed, the dial gauge 6 may be rotationally moved relative to the annular continuous surface.

In this way, the hub unit flange runout measuring jig 50 fills the spaces defined between the projecting portions 11a of the road wheel mounting flange 11, and the flange surfaces of the projecting portions 11a which constitute the flange surface of the road wheel mounting flange 11 become flush with the upper surface of the hub unit flange measuring jig 50, whereby the upper surface of the hub unit flange runout measuring jig 50 lies adjacent to the flange surfaces of the projecting portions 11a so as to form the annular continuous surface. Therefore, the conventional intermittent measurement is eliminated, whereby not only the fall of the measuring terminal of the dial gauge 6 but also the occurrence of abnormal increase in measurement value of runout in the middle of measurement is prevented.

In Embodiments 1, 2, while all the hub unit flange runout measuring jigs 30, 40, 50 have the support legs 31, 41, 51, the support legs 31, 41, 51 can be made unnecessary, provided that the hub unit flange runout measuring jigs 30, 40, 50 can temporarily be fastened on the road wheel mounting flange 11 or the vehicle body mounting flange 26 with an adhesive or the like.

Figure 8:
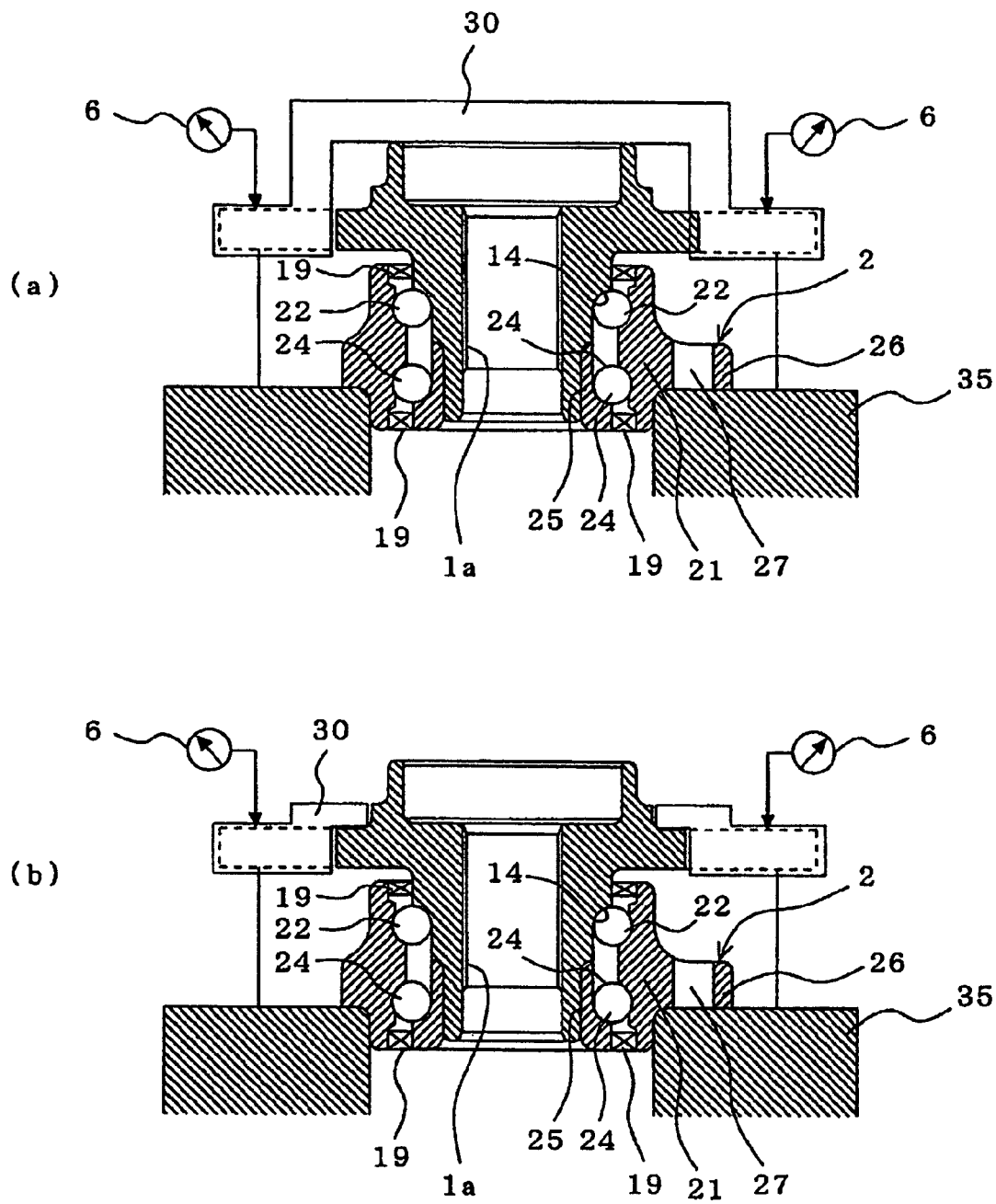
FIG. 8 is a sectional view showing a state in which a runout of a road wheel mounting flange of a deformed type is measured by use of a jig for measuring a runout of a flange of a hub unit according to Embodiment 3 of the invention.

In addition, in Embodiments 1, 2, while the hub unit flange runout measuring jigs 30, 40, 50 are described as being configured integrally, they may be configured otherwise. Embodiment 3 depicts other fixing methods than those described in Embodiments 1, 2. A plurality of jigs, of which each jig is adapted to fill one of the spaces defined between the plate-shaped projecting portions, are assembled to form one jig. As a substitute for the support legs, the jig is fixed to an vehicle outer side end face of a hub wheel 1 as is shown in area (a) of FIG. 8, or as is shown in area (b), the jig is fixed to a radially inward surface of the hub wheel 1.

Further, the materials of the hub unit flange runout measuring jigs 30, 40, 50 of Embodiments 1 to 3 may be any hard material with which the contact needle of the dial gauge 6 can be brought into contact in a stable fashion, including metal, wood, plastic and the like.

Description of Reference Symbols 1 hub wheel; 2 double-row rolling bearing; 11 road wheel mounting flange; 11a flange; 12 bolt insertion hole; 13 bolt; 14 raceway surface; 19 seal member; 21 outer ring; 22 ball; 24 ball; 25 inner ring; 26 vehicle body mounting flange.

The invention claimed is:

1. A jig for measuring a runout of a flange surface of a hub unit used by being mounted to a road wheel mounting flange of a deformed type comprising a plurality of plate-shaped projecting portions which are formed on an outer circumferential surface of a rotating side member of a road wheel hub unit so as to project radially therefrom and each of which has a bolt insertion hole in a distal end portion thereof, said hub unit flange runout measuring jig comprising:
   an annular portion comprising an annulus with a diameter which is the same as an outside diameter defined by the plurality of plate-shaped projecting portions; and
   a plurality of protruding portions which protrude radially inwards from the annular portion to be fitted between the projecting portions when mounted to the road wheel mounting flange of the deformed type such that the protruding portions are positioned adjacent to a flange surface of the projecting portions so as to form an annular continuous surface.

2. A method for measuring a runout comprising:
   a process which combines the plurality of protruding portions of the hub unit flange runout measuring jig according to claim 1 with a road wheel mounting flange of a deformed type such that the plurality of projecting portions are positioned adjacent to a flange surface of projecting portions of the road wheel mounting flange of the deformed type so as to form an annular continuous surface;

bringing a leading end of a measuring terminal of a dial gauge into abutment with the annular continuous surface; and measuring a runout of the flange surface of each of the projecting portions of the road wheel mounting flange of the deformed type by rotating the road wheel mounting flange of the deformed type with the dial gauge fixed or moving rotationally the dial gauge along the annular continuous surface with the road wheel mounting flange of the deformed type fixed.

* * * * *